(12) United States Patent
Zhang et al.

(10) Patent No.: US 10,178,042 B2
(45) Date of Patent: Jan. 8, 2019

(54) SYSTEM, METHOD, AND APPARATUS FOR COMPUTER SYSTEM RESOURCE ALLOCATION

(71) Applicant: ALIBABA GROUP HOLDING LIMITED, George Town, Grand Cayman (KY)

(72) Inventors: Yang Zhang, Beijing (CN); Yihui Feng, Beijing (CN); Jin Ouyang, Beijing (CN); Qiaohuan Han, Beijing (CN); Yangyu Tao, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 275 days.

(21) Appl. No.: 15/261,431

(22) Filed: Sep. 9, 2016

(65) Prior Publication Data

US 2017/0070445 A1 Mar. 9, 2017

(30) Foreign Application Priority Data

Sep. 9, 2015 (CN) .......................... 2015 1 0571508

(51) Int. Cl.
*H04L 29/08* (2006.01)
*H04L 12/911* (2013.01)
(Continued)

(52) U.S. Cl.
CPC .......... *H04L 47/70* (2013.01); *H04L 41/0896* (2013.01); *H04L 43/08* (2013.01)

(58) Field of Classification Search
CPC ..... H04L 47/70; H04L 41/0896; H04L 43/08; H04L 12/911; H04L 12/26
(Continued)

(56) References Cited

U.S. PATENT DOCUMENTS 5,455,821 A * 10/1995 Schaeffer .............. H04W 16/04
370/330
6,223,041 B1 * 4/2001 Egner .................... H04W 16/04
455/450
(Continued)

FOREIGN PATENT DOCUMENTS

EP 3001761 A1 3/2016
EP 3089094 A1 11/2016
(Continued)

OTHER PUBLICATIONS

PCT International Search Report and Written Opinion dated Jan. 6, 2017, issued in corresponding International Application No. PCT/US2016/051113 (14 pages).

*Primary Examiner* — Frantz Coby
(74) *Attorney, Agent, or Firm* — Finnegan, Henderson, Farabow, Garrett & Dunner, LLP (57) ABSTRACT

A computer system resource allocation method is disclosed. The method may be implemented by a process and may comprise acquiring a total system resource and resource allocation data of each resource user submitting a resource application request, the resource allocation data including a maximum resource quota and a requested amount of resource by the each resource user, determining a corresponding resource saturation rate as a ratio between the amount of requested resource and the maximum resource quota, sorting the resource users according to the calculated resource saturation rates of the respective resource users, determining a boundary resource user using a set condition, according to the sorted resource users, and identifying resource users with a resource saturation rate smaller than or equal to that of the boundary resource user to be B-class resource users, and identifying resource users with a
(Continued)

resource saturation rate larger than that of the boundary resource user to be C-class resource users.

20 Claims, 4 Drawing Sheets

(51) Int. Cl.
*H04L 12/24* (2006.01)
*H04L 12/26* (2006.01)

(58) Field of Classification Search
USPC .................................................. 709/226, 223
See application file for complete search history.

(56) References Cited

U.S. PATENT DOCUMENTS

| | | | | |
|---|---|---|---|---|
| 6,262,980 | B1 * | 7/2001 | Leung | H04L 41/0896 370/336 |
| 6,278,983 | B1 * | 8/2001 | Ball | G06Q 10/06 705/1.1 |
| 6,345,287 | B1 * | 2/2002 | Fong | G06F 8/451 718/102 |
| 6,483,820 | B1 * | 11/2002 | Davidson | H04W 28/16 370/329 |
| 6,578,005 | B1 * | 6/2003 | Lesaint | G06Q 10/06 705/7.14 |
| 6,601,083 | B1 | 7/2003 | Reznak | |
| 6,714,515 | B1 * | 3/2004 | Marchand | H04L 47/724 370/231 |
| 6,771,595 | B1 * | 8/2004 | Gilbert | H04L 47/10 370/229 |
| 6,907,243 | B1 * | 6/2005 | Patel | H04W 52/143 455/442 |
| 9,483,207 | B1 | 11/2016 | Srivastava et al. | |
| 9,485,196 | B1 | 11/2016 | Sankaran et al. | |
| 2010/0077107 | A1 | 3/2010 | Lee et al. | |
| 2010/0088422 | A1 | 4/2010 | Weiss et al. | |
| 2010/0275214 | A1 | 10/2010 | Despres | |
| 2011/0202927 | A1 | 8/2011 | Miloushev et al. | |
| 2014/0058871 | A1 | 2/2014 | Marr et al. | |
| 2014/0282589 | A1 | 9/2014 | Kuang et al. | |
| 2015/0200869 | A1 | 7/2015 | Wang et al. | |
| 2015/0350992 | A1 | 12/2015 | Han et al. | |
| 2016/0248798 | A1 | 8/2016 | Cabrera et al. | |
| 2016/0291984 | A1 | 10/2016 | Lu et al. | |
| 2016/0314145 | A1 | 10/2016 | Peck et al. | |
| 2016/0315750 | A1 | 10/2016 | Kim et al. | |
| 2016/0315817 | A1 | 10/2016 | Primet et al. | |
| 2016/0315862 | A1 | 10/2016 | Shum et al. | |
| 2016/0316003 | A1 | 10/2016 | Snider et al. | |
| 2016/0316468 | A1 | 10/2016 | Huang et al. | |
| 2016/0316475 | A1 | 10/2016 | Loehr et al. | |
| 2016/0321046 | A1 | 11/2016 | Pizlo et al. | |

FOREIGN PATENT DOCUMENTS

| | | |
|---|---|---|
| WO | WO 2016/172893 A1 | 11/2016 |
| WO | WO 2016/173412 A1 | 11/2016 |

* cited by examiner

SYSTEM, METHOD, AND APPARATUS FOR COMPUTER SYSTEM RESOURCE ALLOCATION

CROSS REFERENCE TO RELATED APPLICATION

The present application is based on and claims the benefits of priority to Chinese Application No. 201510571508.1, filed Sep. 9, 2015, the entire contents of which are incorporated herein by reference.

TECHNICAL FIELD

The present application relates to the technical field of system resource allocation, and more particularly, to a computer system resource allocation method and a computer system resource allocation device.

BACKGROUND

In order to utilize system resources, resource users usually need to apply for resources under the management of the system. After the system receives a resource application request from one of the resource users, the system allocates a corresponding amount of resources to the resource user. Since the total system resource is fixed, resource available for each resource user is limited. Also, each resource user has a different weight. Some resource users may request a larger amount of resources, while some other resource users may request a smaller amount. Existing resource allocation algorithms may allocate some available resource quota of a resource user requesting fewer resources to another resource user requesting more resources. Such allocation algorithms have a high computational complexity O that is proportional to a square ($n^2$) of a number of resource users n. In addition, even when only one resource allocation quota of a certain resource user is required, such allocation algorithms have to calculate the resource allocation quota of all resource users. For a large system having a great number of resource users, the existing computer system resource allocation methods cannot satisfy real-time calculation requirements. Meanwhile, these methods cannot support a situation where a resource user request allocation of a minimum resource quota.

SUMMARY

One aspect of the present disclosure is directed to a computer system resource allocation method. The method may comprise: acquiring a total system resource and resource allocation data of each resource user submitting a resource application request, the resource allocation data including a maximum resource quota and a requested amount of resource by the each resource user; determining, by a processor, a corresponding resource saturation rate as a ratio between the amount of requested resource and the maximum resource quota; sorting, by the processor, the resource users according to the calculated resource saturation rates of the respective resource users; determining, by the processor, a boundary resource user using a set condition, according to the sorted resource users; identifying, by the processor, resource users with a resource saturation rate smaller than or equal to that of the boundary resource user to be B-class resource users, and identifying resource users with a resource saturation rate larger than that of the boundary resource user to be C-class resource users; and for each of the B-class resource users, allocating, by the processor, its requested amount of resource as a resource quota of the total system resource to the B-class resource users; and for each of the C-class resource users, subtracting all amounts of resources allocated to the B-class resource users from the total system resource to obtain a remaining amount of resource, and allocating the remaining amount of resource to each of the C-class resource users according to a ratio between each C-class resource user's maximum resource quota and a sum of all C-class resource users' maximum resource quotas.

Another aspect of the present disclosure is directed to a computer system resource allocation method. The method may comprise: acquiring a total system resource and resource allocation data of each resource user submitting a resource application request, the resource allocation data including a minimum resource quota, a maximum resource quota, and a requested amount of resource of the each resource user; determining a corresponding resource user's resource saturation rate by determining a difference between the minimum resource quota from the requested amount of resource, and determining a ratio between the difference and the maximum resource quota; sorting resource users whose respective requested amount of resource is larger than the corresponding minimum resource quota according to the calculated resource saturation rate of the each resource user; identifying resource users with the requested amount of resource smaller than or equal to their corresponding minimum resource quota as A-class resource users; determining a boundary resource user using a set condition according to the sorted resource users; identifying resource users with a resource saturation rate smaller than or equal to that of the boundary resource user to be B-class resource users, and identifying resource users with a resource saturation rate larger than that of the boundary resource user to be C-class resource users; and for each of the A-class resource users and the B-class resource users, allocating its requested amount of resource as a resource quota of the total system resource to each of the A-class resource users and the B-class resource users; and for the C-class resource users, determining a remaining amount of resource as a difference between the total system resource and all amount of resource allocated to the A-class resource users and the B-class resource users and a sum of minimum resource quotas of all C-class resource users, and using a ratio between each C-class resource user's maximum resource quota and a sum of maximum resource quotas of all C-class resource users as a resource allocation amount, and allocating the resource allocation amount and the minimum resource quota of the C-class resource user to the each C-class resource user.

Another aspect of the present disclosure is directed to a computer system resource allocation device. The device may comprise: an acquiring unit that acquires a total system resource and resource allocation data of each resource user submitting a resource application request, the resource allocation data including a maximum resource quota and a requested amount of resource by the each resource user; a resource saturation calculation unit that determines a corresponding resource saturation rate as a ratio between the amount of requested amount of resource and the maximum resource quote; a sorting unit that sorts the resource users according to the calculated resource saturation rates of the respective resource users; a classifying unit that determines a boundary resource user using a set condition, according to the sorted resource users, identifies resource users with a resource saturation rate smaller than or equal to that of the boundary resource user to be B-class resource users, and identifies resource users with a resource saturation rate larger than that of the boundary resource user to be C-class resource users; and a resource allocation unit that, for each of the B-class resource users, allocates its requested amount of resource as a resource quota of the total system resource to the B-class resource users; and for each of the C-class resource users, subtracts all amounts of resources allocated to the B-class resource users from the total system resource to obtain a remaining amount of resource, and allocates the remaining amount of resource to each of the C-class resource users according to a ratio between each C-class resource user's maximum resource quota and a sum of all C-class resource users' maximum resource quotas.

Another aspect of the present disclosure is directed to a computer system resource allocation device. The device may comprise an acquiring unit that acquires a total system resource and resource allocation data of each resource user submitting a resource application request, the resource allocation data including a minimum resource quota, a maximum resource quota, and a requested amount of resource by the each resource user; a resource saturation calculation unit that determines a corresponding resource user's resource saturation rate by determining a difference between the minimum resource quota from the requested amount of resource, and determining a ratio between the difference and the maximum resource quota; a sorting unit that sorts resource users whose respective requested amount of resource is larger than the corresponding minimum resource quota according to the calculated resource saturation rate of the each resource user; a classifying unit that identifies resource users with the requested amount of resource smaller than or equal to their corresponding minimum resource quota as A-class resource users, determines a boundary resource user using a set condition according to the sorted resource users, and identifies resource users with a resource saturation rate smaller than or equal to that of the boundary resource user to be B-class resource users, and identifying resource users with a resource saturation rate larger than that of the boundary resource user to be C-class resource users; and a resource allocation unit that, for each of the A-class resource users and the B-class resource users, allocates its requested amount of resource as a resource quota of the total system resource to each of the A-class resource users and the B-class resource users; and for the C-class resource users, determines a remaining amount of resource as a difference between the total system resource and all amount of resource allocated to the A-class resource users and the B-class resource users and a sum of minimum resource quotas of all C-class resource users, and uses a ratio between each C-class resource user's maximum resource quota and a sum of maximum resource quotas of all C-class resource users as a resource allocation amount, and allocates the resource allocation amount and the minimum resource quota of the C-class resource user to the each C-class resource user.

Additional features and advantages of the present disclosure will be set forth in part in the following detailed description, and in part will be apparent from the description, or may be learned by practice of the disclosed embodiments. The features and advantages of the present disclosure will be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In some embodiments, benefits of the invention may include:

1. using a ratio of a maximum resource quota (MaxQuota) of each resource user to allocate the total system resource, to obtain a static scale quota resource (ScaleQuota) of the resource user;

2. when a sum of requested amounts of resources (Request) of all resource users is smaller than the total system resource, a resource quota obtained by each resource user is the resource user's requested amount of resource (Request), and the allocation process is ended;

3. classifying resource users into two types: B-class resource users: a requested amount of resource (Request) of each resource user is smaller than its corresponding static scale quota resource (ScaleQuota); and C-class resource users: a requested amount of resource (Request) of each resource user is larger than its corresponding static scale quota resource (ScaleQuota);

4. For the B-class resource users, a difference between a static scale quota resource (ScaleQuota) and a requested amount of resource (Request) of the resource user can be allocated to the C-class resource users; and these differences are accumulated and summed up, which is determined as a total resource $\partial$ to be re-allocated in the system;

5. The resource $\partial$ is allocated to C-class resource users according to the ratio of the maximum resource quota (MaxQuota) of each resource user, so that a new available resource quota $\Omega$ of the C-class resource user=static scale resource quota (ScaleQuota)+newly allocated resource quota; and 6. if the C-class resource user's $\Omega$ is larger than the resource user's requested amount of resource (Request), a difference between $\Omega$ and the resource user's requested amount of resource (Request) may be further allocated to a resource user in the C-class resource users whose Ω is smaller than the resource user's requested amount of resource (Request), and the algorithm goes back to Step 3 for iteration, till the total resource to be re-allocated ∂=0.

Figure 1:
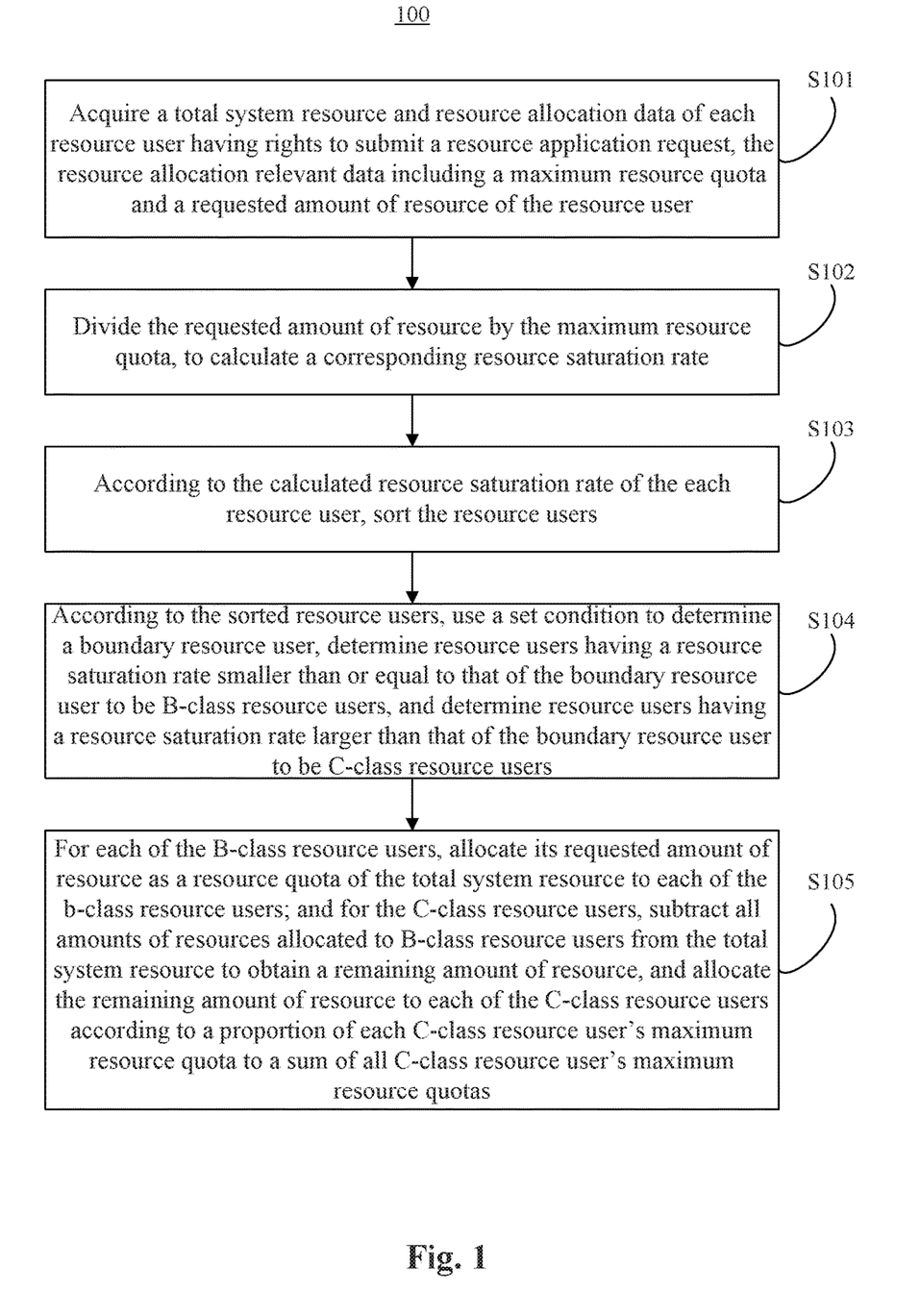
FIG. 1 is a flow chart illustrating a first method for computer system resource allocation, consistent with an exemplary embodiment.

FIG. 1 is a flow chart illustrating a method 100 for computer system resource allocation, consistent with an exemplary embodiment. The method 100 may be performed by a computer system, such as a server, or a special-purpose data processor. The computer system may comprise a processor and a non-transitory computer-readable storage medium storing instructions that, when executed by the processor, perform the steps described below. The method 100 may also be implemented by a device described below with reference to FIG. 2. The method 100 may include the following steps.

Step S101 includes acquiring a total system resource and resource allocation data of each resource user having rights to submit a resource application request, the resource allocation data including a maximum resource quota and a requested amount of resource of the each resource user.

In some embodiments, after receiving a request for a system resource from a resource user, the computer system may acquire the total system resource and the resource allocation data including the resource user's maximum resource quota and data indicating amount of resource applied by the resource user.

Step S102 includes dividing the requested amount of resource by the maximum resource quota, to calculate a corresponding resource saturation rate.

In some embodiments, the computer system may obtain the resource saturation rate of the each resource user by dividing each resource user's requested amount of resource by its maximum resource quota.

Step S103 includes, according to the calculated resource saturation rate of the each resource user, sorting the resource users.

In some embodiments, the computer system may sort the resource users according to values of the calculated resource saturation rates of the resource users. The resource users may be sorted in many ways. For example, when a new resource application request is received, and if the resource user applies for resources for the first time, the system has not sorted the resource user, and correspondingly, a data storage structure for sorting does not contain any data about the resource user. Thus, the computer system may insert the resource user's data including a maximum resource quota, a requested amount of resource, and a resource saturation rate, as a data node, into a sort binary tree, which is sorted according to the resource users' resource saturation rates.

In the binary tree, each upper level node directly connected with a node is called a parent node of the node, and each lower level node directly connected with a node is called a direct child node of the node. In the binary tree, each of the resource saturation rates of the resource users in direct child nodes at one side of any node is smaller than that in the current node, and each of the resource saturation rates of the resource users in direct child nodes at the other side of the current node is larger than that in the current node.

When the data of the resource user who applies for resources is inserted into the binary tree, the binary tree can remain sorted according to the resource saturation rates by rotating node locations and adjusting mutual relations.

When a new resource application request that is not the very first application received from a resource user, the binary tree has saved data of the resource user. In this case, only relevant data about a corresponding tree node, e.g., a requested amount of resource and a resource saturation rate, may need to be updated. Meanwhile, by adjusting the locations and the mutual relations, for example, rotating nodes of the binary tree, the binary tree can remain sorted according to the resource saturation rates.

Step S104 includes according to the sorted resource users, using a set condition to determine a boundary resource user, determine resource users having a resource saturation rate smaller than or equal to that of the boundary resource user to be B-class resource users, and determine resource users having a resource saturation rate larger than that of the boundary resource user to be C-class resource users.

In one embodiment, among the sorted resource users, a resource user whose data satisfies the following two inequalities can be identified as a boundary resource user.

$$\sum_{i=1}^{m} Request_i + Request_h + \frac{Request_h}{MaxQuota_h} \times \sum_{j=1}^{n} MaxQuota_j < TotalResource \quad \text{Inequality I}$$

$$\sum_{i=1}^{m} Request_i + Request_h + \frac{Request_{h+1}}{MaxQuota_{h+1}} \times \sum_{j=1}^{n} MaxQuota_j > TotalResource \quad \text{Inequality II}$$

In the above inequalities, ToatalResource refers to a total system resource; $Request_i$ refers to a requested amount of resource of an ith B-class resource user among all B-class resource users, except the boundary resource user, whose resource saturation rate is smaller than or equal to that of a boundary resource user; $MaxQuota_j$ refers to a maximum resource quota of a jth C-class resource user with a resource saturation rate larger than that of the boundary resource user; $Request_h$ refers to a requested amount of resource of the boundary resource user; $MaxQuota_h$ refers to a maximum resource quota of the boundary resource user; $Request_{h+1}$ refers to, among the sorted resource users, a requested amount of resource of a C-class resource user with a resource saturation rate smaller than that of any other C-class resource user, but larger than that of the boundary resource user; $MaxQuota_{h+1}$ refers to, among the sorted resource users, a maximum resource quota of a C-class resource user with a resource saturation rate smaller than that of any other C-class resource user, but larger than that of the boundary resource user; m refers to a number of B-class resource users, except the boundary resource user, in a system with a resource saturation rate smaller than or equal to that of the boundary resource user; n refers to a number of C-class resource users in a system with a resource saturation rate larger than that of the boundary resource user; and Σ stands for a summation operation.

Among the sorted resource users, resource users with a resource saturation rate smaller than or equal to that of the boundary user can be identified as B-class resource users; and resource users with a resource saturation rate larger than that of the boundary user can be identified as C-class resource users.

The method of searching for the boundary user may be implemented in different ways depending upon different methods of storing the resource users' data. In one embodiment of storing the resource users' data in a binary tree sorted according to the resource saturation rates, first of all, a resource user stored in a root node of the binary tree may be used as a temporary boundary resource user, the data of the temporary boundary resource user can be taken as the data of a boundary resource user; the data of nodes at one side whose resource saturation rate is smaller than or equal to that of the node where the temporary boundary resource user is located can be taken as the data of resource users with a resource saturation rate smaller than or equal to that of the boundary resource user; the data of the nodes at the other side can be taken as the data of resource users with a resource saturation rate larger than that of the boundary resource user; and the data of direct child nodes at the other side can be taken as the data of resource user with a resource saturation rate larger than that of the boundary resource user.

In some embodiments, Inequality I and Inequality II can be used to determine whether the identified temporary boundary resource user is a boundary resource user.

If Inequality I is not satisfied when the temporary boundary resource user is used as the boundary resource user, a resource user stored by a direct child node at one side of the node where the temporary boundary user is located and whose resource saturation rate is smaller than or equal to that of the temporary boundary user may be used as a temporary boundary resource user. Then, data of the new temporary boundary resource user in the sort binary tree can be substituted into Inequality I again. The above steps can be repeated until data of a resource user stored in a certain node, when being used as data of the temporary boundary resource user, can satisfy Inequality I. Then, whether the data of the temporary boundary resource user satisfies Inequality II can be determined.

Alternatively, if Inequality II is not satisfied when the temporary boundary resource user is used as the boundary resource user, a resource user stored in a direct child node at one side of the node where the temporary boundary user is located and whose resource saturation rate is larger than that of the temporary boundary user may be used as a temporary boundary resource user. Then, data of the new temporary boundary resource user in the sort binary tree can be substituted into Inequality II again. The above steps can be repeated until data of a resource user stored in a certain node, when being used as data of the temporary boundary resource user, can satisfy Inequality II. Then, whether the data of the temporary boundary resource user satisfies Inequality I can be determined.

The temporary boundary resource user satisfying both Inequality I and Inequality II may be determined as the boundary resource user.

Resource users with a resource saturation rate smaller than or equal to that of the boundary resource user are known as B-class resource users, and resource users with a resource saturation rate larger than that of the boundary resource user are known as C-class resource users. That is, in the sort binary tree, nodes at one side of the node where the boundary resource user is located can store the data of B-class resource users, and nodes at the other side can store the data of C-class resource users.

According to a resource saturation rate of each resource user who applies for resources, the resource users can be categorized. That is, if a resource saturation rate of a resource user applying for resources is smaller than or equal to that of the boundary resource user, the resource user can be categorized as a B-class resource user; if a resource saturation rate of a resource user applying for resources is larger than that of the boundary resource user, the resource user can be categorized as a C-class resource user.

Step S105 includes, for each of the B-class resource users, allocating its requested amount of resource as a resource quota of the total system resource to each of the B-class resource users; and for each of the C-class resource users, subtracting all amounts of resources allocated to the B-class resource users from the total system resource to obtain a remaining amount of resource, and allocating the remaining amount of resource to each of the C-class resource users according to a proportion of each C-class resource user's maximum resource quota to a sum of all C-class resource users' maximum resource quotas.

In some embodiments, when the resource user applying for resources is a B-class resource user, the requested amounts of resources may be allocated to the resource user.

When the resource user applying for resources is a C-class resource user, a sum of requested amounts of resources of all B-class resource users may be subtracted from the total system resource to obtain a difference, and the difference is a remaining system amount of resource. For the system remaining amount of resource, a proportion of the resource user's maximum resource quota in a sum of maximum resource quotas of all C-class resource users can be used as a resource quota of the resource user to implement resource allocation. That is, the amounts of resources may be allocated according to the following equation:

$$\text{Resource}_x = \frac{\left(\text{TotalResource} - \sum_{i=1}^{m} \text{Request}_i\right) - \text{Request}_h}{\sum_{j=1}^{n} \text{MaxQuota}_j} \times \text{MaxQuota}_x \quad \text{Resource Quota Equation I}$$

In the above equation, $\text{Resource}_x$ refers to a resource quota of a C-class resource user x with a resource saturation rate larger than that of the boundary resource user; $\text{MaxQuota}_x$ refers to a maximum resource quota of a C-class resource user x with a resource saturation rate larger than that of the boundary resource user; ToatalResource refers to a total system resource; $\text{Request}_h$ refers to a requested amount of resource of the boundary resource user; $\text{Request}_i$ refers to a requested amount of resource of an ith B-class resource user, except the boundary resource user, with a resource saturation rate smaller than or equal to that of the boundary resource user; $\text{MaxQuota}_j$ refers to a maximum resource quota of a jth C-class resource user with a resource saturation rate larger than that of the boundary resource user; m refers to a number of all B-class resource users, except the boundary resource user, in a system with a resource saturation rate smaller than or equal to that of the boundary resource user; n refers to a number of C-class resource users in a system with a resource saturation rate larger than that of the boundary resource user; and $\Sigma$ stands for a summation operation.

To simplify the calculation, when inserting or updating tree nodes in Step S103, respective values of summation terms in Inequality I and Inequality II may be saved into the inserted or updated nodes. As such, besides storing a maximum resource quota, a requested amount of resource, and a resource saturation rate of the resource user, each node in the sort binary tree can further store a sum of requested amounts of resources of resource users with a resource saturation rate smaller than or equal to that corresponding to the node, and a sum of maximum resource quotas of resource users with a resource saturation rate larger than that corresponding to the node. As such, using Inequality I and Inequality II to search for the boundary resource user and using the Resource Quota Equation I to calculate the resource user's resource quota can become time-efficient.

Figure 2:
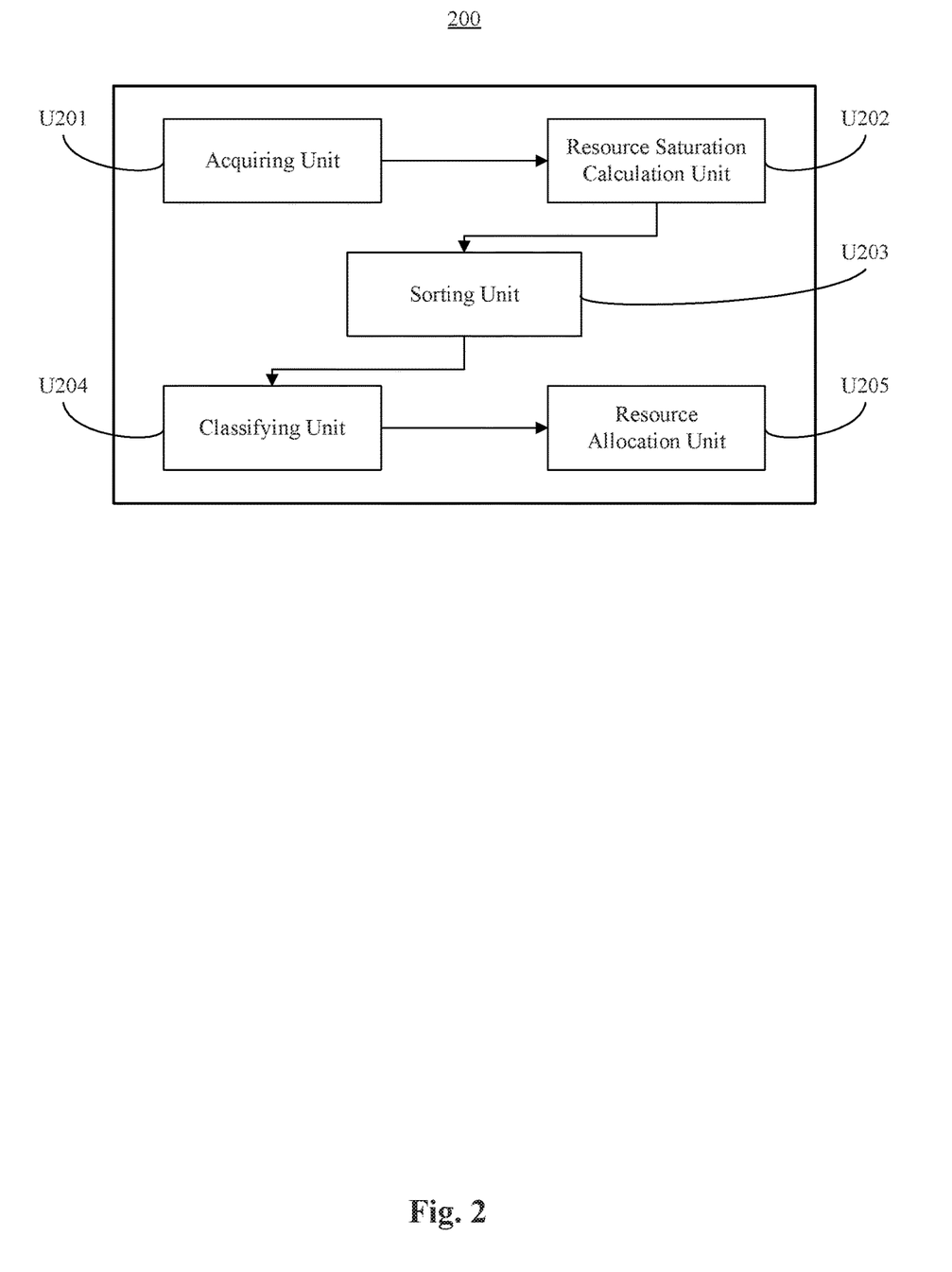
FIG. 2 is a block diagram illustrating a first device for computer system resource allocation, consistent with an exemplary embodiment.

The computer system resource allocation method discussed above can reduce a time complexity for calculating a resource user's resource quota from a level of $O(n^2)$ to a level of $O(\log n)$ (n is a number of resource users). The computer system resource allocation method can also satisfy requirements of real-time calculation, and since it only needs to calculate the resource quota of the resource user who applies for resources, instead of all resource users, the resource allocation process can be further accelerated. Correspondingly, the present application further provides a computer system resource allocation device. Referring to FIG. 2, FIG. 2 is a block diagram illustrating a device 200 for computer system resource allocation, consistent with an exemplary embodiment of the present application. Since the device embodiment is substantially similar to the method embodiment, relevant parts can be obtained with reference to the descriptions of the method embodiment. The device embodiment described below is merely illustrative.

Referring to FIG. 2, the computer system resource allocation device 200 may include: an acquiring unit U201, a resource saturation rate calculation unit U202, a sorting unit U203, a classifying unit U204, and a resource allocation unit U205.

The acquiring unit U201 may acquire a total system resource and resource allocation relevant data of each resource user having rights to submit a resource application request, the resource allocation relevant data including a maximum resource quota and a requested amount of resource of the resource user.

The resource saturation calculation unit U202 may divide the requested amount of resource by the maximum resource quota, to calculate the corresponding resource user's resource saturation rate.

The sorting unit U203 may, according to the calculated resource saturation rate of the each resource user, sort the resource users.

The classifying unit U204 may, according to of the sorted resource users, use a set condition to determine a boundary resource user, determine resource users having a resource saturation rate smaller than or equal to that of a boundary resource user to be B-class resource users, and determine resource users having a resource saturation rate larger than that of the boundary resource user to be C-class resource users.

For each of the B-class resource users, the resource allocation unit U205 may: allocate its requested amount of resource as a resource quota of the total system resource to each of the B-class resource users; and for each of the C-class resource users, the resource allocation unit U205 may subtract all amounts of resources allocated to the B-class resource users from the total system resource to obtain a remaining amount of resource, and allocate the remaining amount of resource to each of the C-class resource users according to a proportion of each C-class resource user's maximum resource quota to a sum of all C-class resource users' maximum resource quotas.

Figure 3:
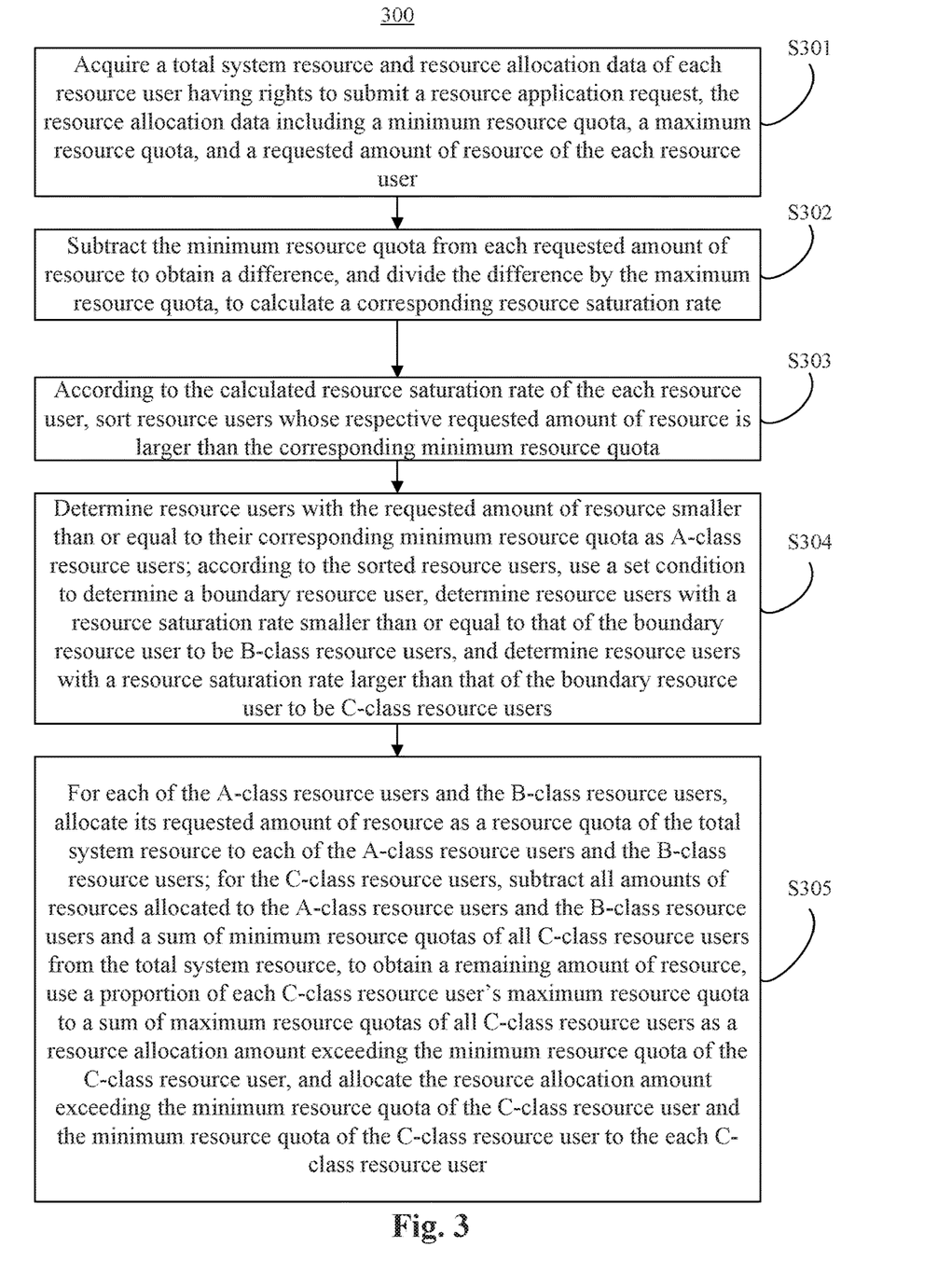
FIG. 3 is a flow chart illustrating a second method for computer system resource allocation, consistent with another exemplary embodiment.

FIG. 3 is a flow chart illustrating a method 300 for computer system resource allocation, consistent with another exemplary embodiment. The method 300 may be performed by a computer system. The computer system may comprise a processor and a non-transitory computer-readable storage medium storing instructions that, when executed by the processor, perform the steps described below. The method 300 may also be implemented by a device described below with reference to FIG. 4. The method 300 may include the following steps.

Step S301 includes acquiring a total system resource and resource allocation data of each resource user having rights to submit a resource application request, the resource allocation data including a minimum resource quota, a maximum resource quota, and a requested amount of resource of the each resource user.

In some embodiments, after receiving a request for system resources from a resource user, the computer system may acquire the total system resource and the resource allocation data including a minimum resource quota, a requested amount of resource, and a maximum resource quota.

Step S302 includes subtracting the minimum resource quota from the requested amount of resource to obtain a difference, and dividing the difference by the maximum resource quota, to calculate a corresponding resource saturation rate.

In some embodiments, the computer system may subtract the minimum resource quota from each resource user's requested amount of resource to obtain a difference and divide the difference by the maximum resource quota to obtain a resource saturation rate of the each resource user. For a resource user whose requested amount of resource is smaller than or equal to its minimum resource quota, the resource user's resource saturation rate may be a negative number or zero; for a resource user whose requested amount of resource is larger than its minimum resource quota, the resource user's resource saturation rate may be larger than zero.

Step S303 includes, according to the calculated resource saturation rate of the each resource user, sorting resource users whose respective requested amount of resource is larger than the corresponding minimum resource quota.

In some embodiments, the computer system may, according to a values of the calculated saturation rates, sort resource users whose requested amount of resource is larger than the corresponding minimum resource quota, e.g., sort resource users whose resource saturation rates is larger than zero.

When a request for resources is received from a resource user, and if the resource user applies for resources for the first time, or if the system has not sorted the resource user before, correspondingly, a data storage structure for sorting does not contain any data about the resource user. Thus, the computer system may insert the resource user's data including a maximum resource quota, a minimum resource quota, a requested amount of resource, and a resource saturation rate, as a data node, into a sort binary tree, which is sorted according to the resource users' resource saturation rates.

In the binary tree, any of the resource saturation rates of the resource users stored in direct child nodes at one side of any node is smaller than or equal to that stored in the current node, and any of the resource saturation rates of the resource users stored in direct child nodes at the other side of the current node is larger than that stored in the current node.

When the data of the resource user who applies for resources is inserted into the binary tree, the binary tree can remain sorted according to the resource saturation rates by rotating node locations and adjusting mutual relations.

When a resource application that is not the very first application received, and the system has sorted the resource user, correspondingly, the data storage structure for sorting contains the data about the resource user. In this case, only relevant data about a corresponding node in the sort binary tree, e.g., a requested amount of resource and a resource saturation rate, may need to be updated. Meanwhile, by adjusting the locations and the mutual relations, for example, rotating nodes of the binary tree, the binary tree can remain sorted according to the resource saturation rate.

Step S304 includes determining resource users with the requested amount of resource smaller than or equal to their corresponding minimum resource quota as A-class resource users; according to the sorted resource users, using a set condition to determine a boundary resource user, determine resource users with a resource saturation rate smaller than or equal to that of the boundary resource user to be B-class resource users, and determine resource users with a resource saturation rate larger than that of the boundary resource user to be C-class resource users.

In some embodiments, resources users with a requested amount of resource smaller than their minimum resource quota or equal to the resource quota can be referred to as A-class resource users.

In some embodiments, resource users with a requested amount of resource larger than their minimum resource quota may be sorted, and a set condition may be used to determine a boundary resource user.

In one embodiment, among sorted resource users, a resource user whose data satisfies the following two inequalities can be identified as a boundary resource user.

$$\sum_{i=1}^{m}(Request_i - MinQuota_i) + (Request_h - MinQuata_h) + \qquad \text{Inequality III}$$
$$\frac{(Request_h - MinQuata_h)}{MaxQuota_h} \times \sum_{j=1}^{n} MaxQuota_j <$$
$$TotalResource - \sum_{i=1}^{m} MinQuota_i - MinQuata_h -$$
$$\sum_{j=1}^{n} MinQuota_j - \sum_{k=1}^{s} Request_k$$

$$\sum_{i=1}^{m}(Request_i - MinQuota_i) + (Request_h - MinQuata_h) + \qquad \text{Inequality IV}$$
$$\frac{(Request_{h+1} - MinQuata_{h+1})}{MaxQuota_{h+1}} \times \sum_{j=1}^{n} MaxQuota_j >$$
$$TotalResource - \sum_{i=1}^{m} MinQuota_i - MinQuata_h -$$
$$\sum_{j=1}^{n} MinQuota_j - \sum_{k=1}^{s} Request_k$$

Furthermore, by combining similar terms, the above two inequalities can be simplified into the following forms:

$$\sum_{i=1}^{m} Request_i + Request_h + \qquad \text{Inequality III}$$
$$\frac{(Request_h - MinQuata_h)}{MaxQuota_h} \times \sum_{j=1}^{n} MaxQuota_j <$$
$$TotalResource - \sum_{j=1}^{n} MinQuota_j - \sum_{k=1}^{s} Request_k$$

$$\sum_{i=1}^{m} Request_i + Request_h + \qquad \text{Inequality IV}$$
$$\frac{(Request_{h+1} - MinQuata_{h+1})}{MaxQuota_{h+1}} \times \sum_{j=1}^{n} MaxQuota_j >$$
$$TotalResource - \sum_{j=1}^{n} MinQuota_j - \sum_{k=1}^{s} Request_k$$

In the above inequalities:

ToatalResource refers to a total system resource; $Request_k$ refers to a requested amount of resource of a kth resource user with a requested amount of resource smaller than or equal to its minimum resource quota; $MinQuota_i$ refers to a minimum resource quota of an ith B-class resource user, except the boundary resource user, among all B-class resource users with a resource saturation rate smaller than or equal to that of the boundary resource user, and with a requested amount of resource larger than their corresponding minimum resource quota; $Request_i$ refers to a requested amount of resource of an ith B-class resource user, except the boundary resource user, among all B-class resource users with a resource saturation rate smaller than or equal to that of the boundary resource user, and with a requested amount of resource larger than that of their corresponding minimum resource quota; $MaxQuota_j$ refers to a maximum resource quota of a jth C-class resource user with a resource saturation rate larger than that of the boundary resource user, and with a requested amount of resource larger than its corresponding minimum resource quota; $MinQuota_j$ refers to a minimum resource quota of a jth C-class resource user with a resource saturation rate larger than that of the boundary resource user, and with a requested amount of resource larger than its corresponding minimum resource quota; $Request_h$ refers to a requested amount of resource of the boundary resource user; $MaxQuota_h$ refers to a maximum resource quota of the boundary resource user; $MinQuota_h$ refers to a minimum resource quota of the boundary resource user; $Request_{h+1}$ refers to, for the sorted resource users, a requested amount of resource of a C-class resource user with a resource saturation rate smaller than that of any other resource user whose resource saturation rate is larger than that of the boundary resource user, but with the resource saturation larger than that of the boundary resource user; $MaxQuota_{h+1}$ refers to, for the sorted resource users, a maximum resource quota of a C-class resource user with a resource saturation smaller than that of any other resource user whose resource saturation rate is larger than that of the boundary resource user, but with the resource saturation rate larger than that of the boundary resource user; $MinQuota_{h+1}$ refers to, for the sorted resource users, a minimum resource quota of a C-class resource user with a resource saturation smaller than that of any other resource user whose resource saturation rate is larger than that of the boundary resource user, but with the resource saturation rate larger than that of the boundary resource user; s refers to a number of A-class resource users in a system with a requested amount of resource smaller than or equal to their corresponding minimum resource quota; m refers to a number of B-class resource users, except the boundary resource user, in a system with a resource saturation rate smaller than or equal to that of the boundary resource user, and with a requested amount of resource larger than their corresponding minimum resource quota; n refers to a amount of C-class resource users in a system with a resource saturation rate larger than that of the boundary resource user; and $\Sigma$ stands for a summation operation.

A resource user with a resource saturation rate smaller than or equal to that of the boundary resource user is known as a B-class resource user; and a resource user with a resource saturation rate larger than that of the boundary resource user is known as a C-class resource user.

The method of searching for the boundary user may be implemented in different ways depending upon different methods of storing the resource users' data. In one embodiment of storing the resource users' data in a binary tree sorted according to the resource saturation rates, first of all, a resource user stored in a root node of the binary tree may be used as a temporary boundary resource user, the data of the temporary boundary resource user can be taken as the data of a boundary resource user; the data of nodes at one side whose resource saturation rate is smaller than that of the node where the temporary boundary resource user is located can be taken as the data of resource users with a resource saturation rate smaller than or equal to that of the boundary resource user; the data of the nodes at the other side can be taken as the data of resource users with a resource saturation rate larger than that of the boundary resource user; and the data of direct child nodes at the other side can be taken as the data of resource user with a resource saturation rate larger than that of the boundary resource user.

In some embodiments, Inequality III and Inequality IV can be used to determine whether the identified temporary boundary resource user is a boundary resource user or not.

If Inequality III is not satisfied when the temporary boundary resource user is used as the boundary resource user, a resource user stored in a direct child node at one side of the node where the temporary boundary user is located may be used as a temporary boundary resource user. That side of the node has a resource saturation rate smaller than or equal to that of the temporary boundary user. Then, data of the new temporary boundary resource user in the sort binary tree can be substituted into Inequality III again. The above steps can be repeated until data of a resource user stored in a certain node, when being used as the data of the temporary boundary resource user, can satisfy Inequality III. Then, whether the data of the temporary boundary resource user satisfies Inequality IV can be determined.

If Inequality IV is not satisfied when the temporary boundary resource user is used as the boundary resource user, a resource user stored in a direct child node at one side of the node where the temporary boundary user is located may be used as a temporary boundary resource user. That side of the node has a resource saturation rate larger than that of the temporary boundary user. Then, data of the new temporary boundary resource user in the sort binary tree can be substituted into Inequality IV again. The steps above can be repeated until data of a resource user stored in a certain node, when being used as data of the temporary boundary resource user, can satisfy Inequality IV. Then, whether the data of the temporary boundary resource user satisfies Inequality III can be determined.

The temporary boundary resource user satisfying both Inequality III and Inequality IV may be determined as the boundary resource user.

Resource users with a resource saturation rate smaller than or equal to that of the boundary resource user are known as B-class resource users, and resource users with a resource saturation rate larger than that of the boundary resource user are known as C-class resource users. That is, in the sort binary tree, nodes at one side of the node where the boundary resource user is located can store the data of B-class resource users, and nodes at the other side can store the data of C-class resource users.

According to a requested amount of resource, a minimum resource quota, a maximum resource quota, and a resource saturation rate of each resource user who applies for resources, the resource users can be categorized. That is, if a requested amount of resource of a resource user applying for resources is smaller than or equal to its minimum resource quota, the resource user applying for resources can be categorized as an A-class resource user; if a requested amount of resource of a resource user applying for resources is larger than its minimum resource quota, and its resource saturation rate is smaller than or equal to that of the boundary resource user, the resource user applying for resources can be categorized a B-class resource user; if a requested amount of resource of a resource user applying for resources is larger than its minimum resource quota, and its resource saturation rate is larger than that of the boundary resource user, the resource user applying for resources can be categorized as a C-class resource user.

Step S305 includes: for each of the A-class resource users and the B-class resource users, allocating its requested amount of resource as a resource quota of the total system resource to each of the A-class resource users and the B-class resource users; for the C-class resource users, subtracting all amounts of resources allocated to the A-class resource users and the B-class resource users and a sum of minimum resource quotas of all C-class resource users from the total system resource, to obtain a remaining amount of resource, using a proportion of each C-class resource user's maximum resource quota to a sum of maximum resource quotas of all C-class resource users as a resource allocation amount exceeding the minimum resource quota of the C-class resource user, and allocating the resource allocation amount exceeding the minimum resource quota of the C-class resource user and the minimum resource quota of the C-class resource user to the each C-class resource user.

In some embodiments, when the resource user applying for resources is an A-class or B-class resource users, the requested amounts of resources may be allocated to the resource user.

When the resource user applying for resources is a C-class resource user, a sum of requested amounts of resources of A-class resource users and B-class resource users and the minimum resource quotas of all C-class resource users may be subtracted from the total system resource, to obtain a system remaining amount of resource. For the system remaining amount of resource, a proportion of a maximum resource quota of the C-class resource user in a sum of maximum resource quotas of all C-class resource users can be used as a resource quota exceeding the minimum resource quota of the C-class resource user, and the resource quota exceeding the minimum resource quota of the C-class resource user can be added with the minimum resource quota of the C-class resource user to obtain a resource quota of the C-class resource users to implement resource allocation. That is, the amounts of resources may be allocated according to the following equation:

Resource Quota Equation II:
$$\text{Resource}_x = (\text{TotalResource} - \Sigma_{i=1}^{m}\text{MinQuota}_i - \Sigma_{j=1}^{n}\text{MinQuota}_j - \Sigma_{k=1}^{s}\text{Request}_k - \Sigma_{i=1}^{m}(\text{Request}_i - \text{MinQuota}_i) - \text{Request}_h) \div \Sigma_{j=1}^{n}\text{MaxQuota}_j \times \text{MaxQuota}_x + \text{MinQuota}_x$$

Furthermore, by combining similar terms in the above equation, the above Resource Quota Equation II can be simplified into the following form:

$$Resource_x = (TotalResource - \Sigma_{j=1}^{n} MinQuota_j - \Sigma_{k=1}^{s} Request_k - \Sigma_{i=1}^{m} Request_i - Request_h)$$
$$\div \Sigma_{j=1}^{n} MaxQuota_j \times MaxQuota_x + MinQuota_x$$

In the above equation, $Resource_x$ refers to a resource quota of a C-class resource user x with a resource saturation rate larger than that of the boundary resource user; $MinQuota_x$ refers to a minimum resource quota of a C-class resource user x with a resource saturation rate larger than that of the boundary resource user; $MaxQuota_x$ refers to a maximum resource quota of a C-class resource user x with a resource saturation rate larger than that of the boundary resource user; ToatalResource refers to a total system resource; $Request_k$ refers to a requested amount of resource of a kth A-class resource user with a requested amount of resource smaller than its minimum resource quota; $MinQuota_i$ refers to a minimum resource quota of an ith B-class resource user, except the boundary resource user, with a resource saturation rate smaller than or equal to that of the boundary resource user, and with a requested amount of resource larger than their corresponding minimum resource quota; $Request_i$ refers to a requested amount of resource of an ith B-class resource user, except the boundary resource user, with a resource saturation rate smaller than or equal to that of the boundary resource user, and with a requested amount of resource larger than that of their corresponding minimum resource quota; $MaxQuota_j$ refers to a maximum resource quota of a jth C-class resource user with a resource saturation rate larger than that of the boundary resource user; $MinQuota_j$ refers to a minimum resource quota of a jth C-class resource user with a resource saturation rate larger than that of the boundary resource user; $Request_h$ refers to a requested amount of resource of the boundary resource user; s refers to a number of A-class resource users in a system with a requested amount of resource smaller than their corresponding minimum resource quota; m refers to a number of B-class resource users, except the boundary resource user, in a system with a resource saturation rate smaller than or equal to that of the boundary resource user, and with a requested amount of resource larger than their corresponding minimum resource quota; n refers to a number of C-class resource users in a system with a resource saturation rate larger than that of the boundary resource user; and $\Sigma$ stands for a summation operation.

To simplify the calculation, when inserting or updating tree nodes in Step S303, respective values of summation terms in Inequality III and Inequality IV may be saved or updated into the inserted or updated nodes. As such, besides storing a maximum resource quota, a minimum resource quota, a requested amount of resource, and a resource saturation rate of the resource user, each node in the sort binary tree can further store the following data: a sum of requested amounts of resources of resource users with a resource saturation rate smaller than or equal to that of the resource user corresponding to the node, a sum of minimum resource quotas of resource users with a resource saturation rate smaller than or equal to that of the resource user corresponding to the node, a sum of maximum resource quotas of resource users with a resource saturation rate larger than that of the resource user corresponding to the node, a sum of minimum resource quotas of resource users with a resource saturation rate larger than that of the resource user corresponding to the node, and a sum of requested amounts of resources of resource users with a requested amount of resource smaller than their corresponding minimum quota. As such, using Inequality III and Inequality IV to search for the boundary resource user and using the Resource Quota Equation II to calculate the resource user's resource quota can become time-efficient.

Figure 4:
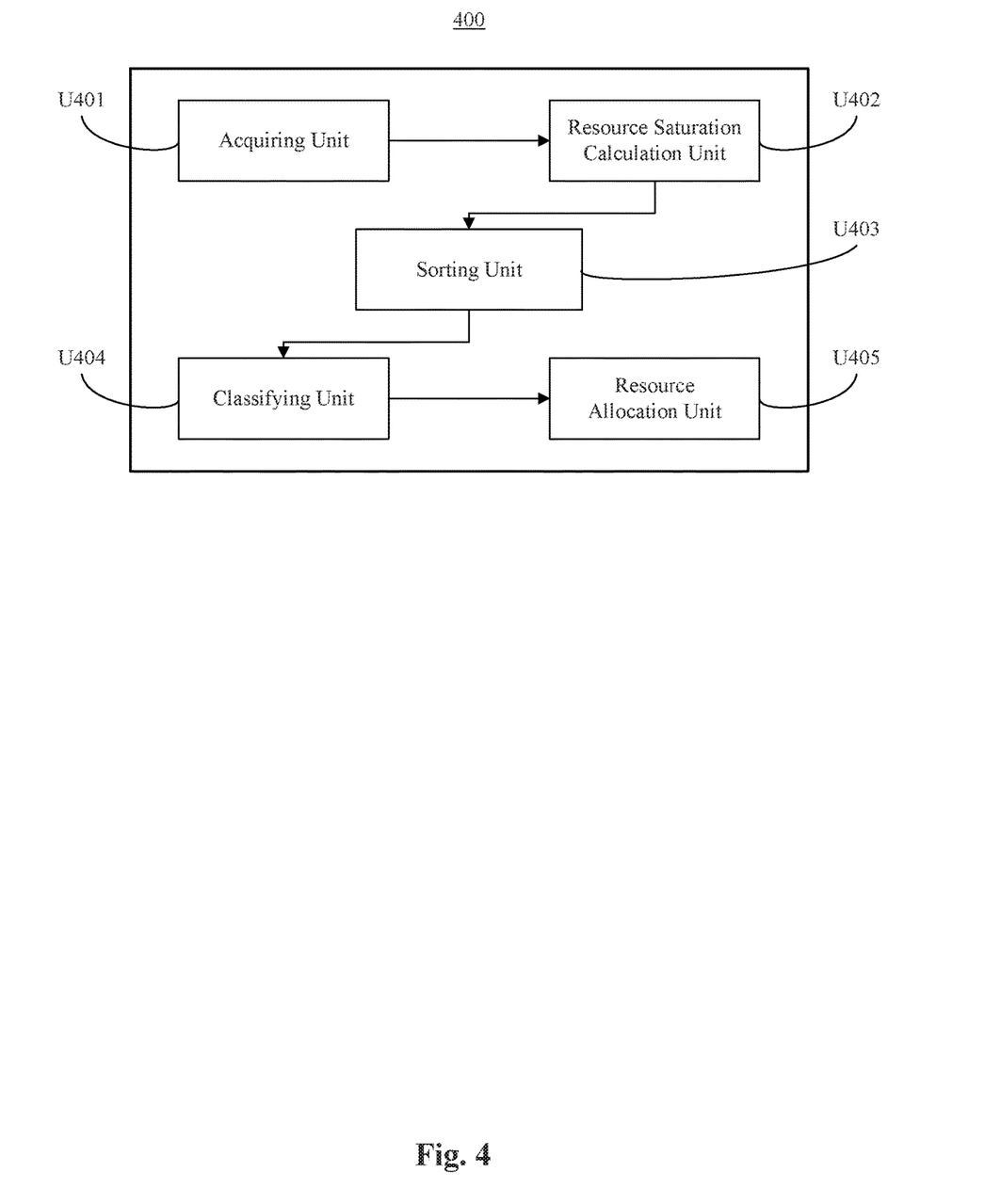
FIG. 4 is a block diagram illustrating a second device for computer system resource allocation, consistent with another exemplary embodiment.

In the above embodiments, the present application provides a computer system resource allocation method, which not only can reduce a time complexity for calculating a resource user's resource quota, and satisfy requirements of real-time calculation, without calculating the resource quota of all resource users, but also can configure the resource users' minimum resource quota. Correspondingly, the present application further provides a computer system resource allocation device. Referring to FIG. 4, FIG. 4 is a block diagram illustrating a device 400 for computer system resource allocation, consistent with another exemplary embodiment. Since the device embodiment is substantially similar to the method embodiment of FIG. 3 the relevant parts can be obtained with reference to the descriptions of the method embodiment. The device embodiment described below is merely illustrative.

The device 400 may include: an acquiring unit U401, a resource saturation calculation unit U402, a sorting unit U403, a classifying unit U404, and a resource allocation unit U405.

The acquiring unit U401 may acquire a total system resource and resource allocation data of each resource user having rights to submit a resource application request, the resource allocation data including a minimum resource quota, a maximum resource quota, and a requested amount of resource of the each resource user.

The resource saturation calculation unit U402 may subtract the minimum resource quota from the requested amount of resource to obtain a difference, and divide the difference by the maximum resource quota, to calculate a corresponding resource saturation rate.

The sorting unit U403 may, according to the calculated resource saturation rate of the each resource user, sort resource users whose requested amount of resource is larger than the corresponding minimum resource quota.

The classifying unit U404 may determine resource users with the requested amount of resource smaller than or equal to their corresponding minimum resource quota as A-class resource users; according to of the sorted resource users, use a set condition to determine a boundary resource user, with resource users with a resource saturation rate smaller than or equal to that of the boundary resource user being B-class resource users, and resource users with a resource saturation rate larger than that of the boundary resource user being C-class resource users.

For each of the A-class resource users and the B-class resource users, the resource allocation unit U405 may allocate its requested amount of resource as a resource quota of the total system resource to each of the A-class resource users and the B-class resource users. For the C-class resource users, the resource allocation unit U405 may subtract all amounts of resources allocated to the A-class resource users and the B-class resource users and a sum of minimum resource quotas of all C-class resource users from the total system resource, to obtain a remaining amount of resource. The resource allocation unit U405 may then determine a proportion of each C-class resource user's maximum resource quota to a sum of maximum resource quotas of all C-class resource users as a resource allocation amount exceeding the minimum resource quota of the C-class resource user. The resource allocation unit U405 may then allocate the resource allocation amount exceeding the minimum resource quota of the C-class resource user and the minimum resource quota of the C-class resource user to the each C-class resource user.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks may be substantially executed in parallel, and sometimes, they may also be executed in the reverse order, depending on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more computer-readable storage media (including but not limited to a magnetic disk memory, a CD-ROM, an optical memory, etc.) containing computer-readable program codes.

Embodiments of the present disclosure are described with reference to flow charts and/or block diagrams of methods, devices (systems), and computer program products according to embodiments of the present disclosure. It will be understood that each flow and/or block of the flow charts and/or block diagrams, and combinations of flows and/or blocks in the flow charts and/or block diagrams, may be implemented by computer program instructions. These computer program instructions may be provided to a processor of a computer, an embedded processor, or other programmable data processing devices to produce a machine, such that the instructions, which are executed via the processor of the computer or other programmable data processing devices, create a means for implementing the functions specified in one or more flows in the flow charts and/or one or more blocks in the block diagrams.

These computer program instructions may also be stored in a computer-readable memory that may direct a computer or other programmable data processing devices to function in a particular manner, such that the instructions stored in the computer-readable memory produce a manufactured product including an instruction means that implements the functions specified in one or more flows in the flow charts and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow charts and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for computer system resource allocation. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A computer system resource allocation method, comprising:
   acquiring a total system resource and resource allocation data of each resource user submitting a resource application request, the resource allocation data including a maximum resource quota and a requested amount of resource by the each resource user;
   determining, by a processor, a corresponding resource saturation rate as a ratio between the amount of requested resource and the maximum resource quota;
   sorting, by the processor, the resource users according to the calculated resource saturation rates of the respective resource users;
   determining, by the processor, a boundary resource user using a set condition, according to the sorted resource users;
   identifying, by the processor, resource users with a resource saturation rate smaller than or equal to that of the boundary resource user to be B-class resource users, and identifying resource users with a resource saturation rate larger than that of the boundary resource user to be C-class resource users; and
   for each of the B-class resource users, allocating, by the processor, a requested amount of resource as a resource quota of the total system resource to the B-class resource users; and
   for each of the C-class resource users, subtracting all amounts of resources allocated to the B-class resource users from the total system resource to obtain a remaining amount of resource, and allocating the remaining amount of resource to each of the C-class resource users according to a ratio between each C-class resource user's maximum resource quota and a sum of all C-class resource users' maximum resource quotas.

2. The computer system resource allocation method according to claim 1, wherein the set condition for determining the boundary resource user includes satisfying Inequality I and Inequality II, with $$\sum_{i=1}^{m} Request_i + Request_h + \frac{Request_h}{MaxQuota_h} \times \sum_{j=1}^{n} MaxQuota_j < TotalResource \quad \text{Inequality I}$$

-continued $$\sum_{i=1}^{m} Request_i + Request_h + \frac{Request_{h+1}}{MaxQuota_{h+1}} \times \sum_{j=1}^{n} MaxQuota_j > TotalResource \quad \text{Inequality II}$$

TotalResource: a total system resource; $Request_i$: a requested amount of resource of an $i^{th}$ B-class resource user among the B-class resource users, except the boundary resource user, whose resource saturation rate is smaller than or equal to that of a boundary resource user; $MaxQuota_j$: a maximum resource quota of a $j^{th}$ C-class resource user with a resource saturation rate larger than that of the boundary resource user; $Request_h$: a requested amount of resource of the boundary resource user; $MaxQuota_h$: a maximum resource quota of the boundary resource user; $Request_{h+1}$: among the sorted resource users, a requested amount of resource of a C-class resource user with a resource saturation rate smaller than that of any other C-class resource user, but larger than that of the boundary resource user; $MaxQuota_{h+1}$: among the sorted resource users, a maximum resource quota of a C-class resource user with a resource saturation rate smaller than that of any other C-class resource user, but larger than that of the boundary resource user; m: a number of B-class resource users, except the boundary resource user, in a system with a resource saturation rate smaller than or equal to that of the boundary resource user; n: a number of C-class resource users in a system with a resource saturation rate larger than that of the boundary resource user; and $\Sigma$: a summation operation.

3. The computer system resource allocation method according to claim 2, wherein, determining the boundary resource user, comprises:
   (a) using one of the sorted resource users as a temporary boundary resource user;
   (b) substituting the temporary boundary resource user into Inequality I and Inequality II as one of the boundary resource users;
   (c) if the two inequalities are both satisfied, determining the temporary resource user to be one of the boundary resource users; and
   (d) if the two inequalities are not both satisfied, using another one of the sorted resource users as the temporary boundary resource user to perform steps (b)-(d).

4. The computer system resource allocation method according to claim 3, wherein using one of the sorted resource users as a temporary boundary resource user comprises:
   if Inequality I is not satisfied, selecting, from the sorted resource users, a first resource user with a resource saturation rate smaller than that of the temporary boundary resource user, and using the first selected resource user as a temporary boundary resource user; and
   if Inequality II is not satisfied, selecting, from the sorted resource users, a second resource user with a resource saturation rate larger than that of the temporary boundary resource user, and using the second selected resource user as a temporary boundary resource user.

5. The computer system resource allocation method according to claim 4, wherein:
   sorting the resource users comprises:
   using a resource user's resource allocation data to form one tree node, according to a value of the calculated resource saturation rate, inserting the tree node into a sort binary tree, or updating a data node of the sort binary tree for storing the resource user according to the tree node, and adjusting locations and mutual relations among nodes of the sort binary tree to maintain the binary tree as sorted; wherein the resource user's resource allocation relevant data comprises a resource saturation rate, a requested amount of resource, and a maximum resource quota of the resource user;

correspondingly, using one of the sorted resource users as the temporary boundary resource user comprises: using a resource user stored in a root node of the sort binary tree as a temporary boundary resource user;

correspondingly, selecting, from the sorted resource users, the first resource user with the resource saturation rate smaller than that of the temporary boundary resource user comprises: selecting a resource user corresponding to a direct child node at one side of the sort binary tree with a resource saturation rate smaller than or equal to that of the temporary boundary resource user; and correspondingly, selecting, from the sorted resource users, the second resource user with the resource saturation rate larger than that of the temporary boundary resource user comprises: selecting a resource user corresponding to a direct child node at one side of the sort binary tree with a resource saturation rate larger than that of the temporary boundary resource user.

6. The computer system resource allocation method according to claim 5, wherein the resource user's resource allocation relevant data further comprises: a sum of requested amounts of resources of resource users with a resource saturation rate smaller than or equal to that of the resource user, and a sum of maximum resource quotas of resource users with a resource saturation rate larger than that of the resource user.

7. The computer system resource allocation method according to claim 1, wherein, sorting the resource users comprises:

using a resource user's resource allocation data to form one tree node;

according to a magnitude of a resource saturation rate, inserting the tree node into a sort binary tree, or updating a data node of the sort binary tree for storing the resource user according to the tree node; and adjusting locations and mutual relations among nodes of the sort binary tree to maintain the binary tree as sorted, wherein the resource user's resource allocation relevant data comprises a resource saturation rate, a requested amount of resource, and a maximum resource quota of the resource user.

8. The computer system resource allocation method according to claim 7, wherein the resource user's resource allocation relevant data further comprises: a sum of requested amounts of resources of resource users with a resource saturation rate smaller than or equal to that of the resource user, and a sum of maximum resource quotas of resource users with a resource saturation rate larger than that of the resource user.

9. A computer system resource allocation method, comprising:

acquiring a total system resource and resource allocation data of each resource user submitting a resource application request, the resource allocation data including a minimum resource quota, a maximum resource quota, and a requested amount of resource of the each resource user;

determining a corresponding resource user's resource saturation rate by determining a difference between the minimum resource quota from the requested amount of resource, and determining a ratio between the difference and the maximum resource quota;

sorting resource users whose respective requested amount of resource is larger than the corresponding minimum resource quota according to the calculated resource saturation rate of the each resource user;

identifying resource users with the requested amount of resource smaller than or equal to their corresponding minimum resource quota as A-class resource users;

determining a boundary resource user using a set condition according to the sorted resource users;

identifying resource users with a resource saturation rate smaller than or equal to that of the boundary resource user to be B-class resource users, and identifying resource users with a resource saturation rate larger than that of the boundary resource user to be C-class resource users; and for each of the A-class resource users and the B-class resource users, allocating a requested amount of resource as a resource quota of the total system resource to each of the A-class resource users and the B-class resource users; and for the C-class resource users, determining a remaining amount of resource as a difference between the total system resource and all amount of resource allocated to the A-class resource users and the B-class resource users and a sum of minimum resource quotas of all C-class resource users, and using a ratio between each C-class resource user's maximum resource quota and a sum of maximum resource quotas of all C-class resource users as a resource allocation amount, and allocating the resource allocation amount and the minimum resource quota of the C-class resource user to the each C-class resource user.

10. The computer system resource allocation method according to claim 9, wherein the set condition includes the data of the boundary resource user satisfying Inequality III and Inequality IV as follows:

$$\sum_{i=1}^{m}(\text{Request}_i - \text{MinQuota}_i) + (\text{Request}_h - \text{MinQuota}_h) + \frac{(\text{Request}_h - \text{MinQuota}_h)}{\text{MaxQuota}_h} \times \sum_{j=1}^{n} \text{MaxQuota}_j < \text{TotalResource} - \sum_{i=1}^{m} \text{MinQuota}_i - \text{MinQuota}_h - \sum_{j=1}^{n} \text{MinQuota}_j - \sum_{k=1}^{s} \text{Request}_k \quad \text{Inequality III}$$

-continued $$\sum_{i=1}^{m}(\text{Request}_i - \text{MinQuota}_i) + (\text{Request}_h - \text{MinQuota}_h) +$$

$$\frac{(\text{Request}_{h+1} - \text{MinQuota}_{h+1})}{\text{MaxQuota}_{h+1}} \times \sum_{j=1}^{n}\text{MaxQuota}_j >$$

$$\text{TotalResource} - \sum_{i=1}^{m}\text{MinQuota}_i - \text{MinQuota}_h -$$

$$\sum_{j=1}^{n}\text{MinQuota}_j - \sum_{k=1}^{s}\text{Request}_k$$

Inequality IV

TotalResource: a total system resource; $\text{Request}_k$: a requested amount of resource of a $k^{th}$ resource user with a requested amount of resource smaller than or equal to its minimum resource quota; $\text{MinQuota}_i$: a minimum resource quota of an $i^{th}$ B-class resource user, except the boundary resource user, among all B-class resource users with a resource saturation rate smaller than or equal to that of the boundary resource user, and with a requested amount of resource larger than their corresponding minimum resource quota; $\text{Request}_i$: a requested amount of resource of an $i^{th}$ B-class resource user, except the boundary resource user, among all B-class resource users with a resource saturation rate smaller than or equal to that of the boundary resource user, and with a requested amount of resource larger than that of their corresponding minimum resource quota; $\text{MaxQuota}_j$: a maximum resource quota of a $j^{th}$ C-class resource user with a resource saturation rate larger than that of the boundary resource user, and with a requested amount of resource larger than its corresponding minimum resource quota; $\text{MinQuota}_j$: a minimum resource quota of $j^{th}$ C-class resource user with a resource saturation rate larger than that of the boundary resource user, and with a requested amount of resource larger than its corresponding minimum resource quota; $\text{Request}_h$: a requested amount of resource of the boundary resource user; $\text{MaxQuota}_h$: a maximum resource quota of the boundary resource user; $\text{MinQuota}_h$: a minimum resource quota of the boundary resource user; $\text{Request}_{h+1}$: for the sorted resource users, a requested amount of resource of a C-class resource user with a resource saturation rate smaller than that of any other resource user whose resource saturation rate is larger than that of the boundary resource user, but with the resource saturation rate larger than that of the boundary resource user; $\text{MaxQuota}_{h+1}$: for the sorted resource users, a maximum resource quota of a C-class resource user with a resource saturation rate smaller than that of any other resource user whose resource saturation rate is larger than that of the boundary resource user, but with the resource saturation rate larger than that of the boundary resource user; $\text{MinQuota}_{h+1}$: for the sorted resource users, a minimum resource quota of a C-class resource user with a resource saturation rate smaller than that of any other resource user whose resource saturation rate is larger than that of the boundary resource user, but with the resource saturation rate larger than that of the boundary resource user; s: a number of A-class resource users in a system with a requested amount of resource smaller than or equal to their corresponding minimum resource quota; m: a number of B-class resource users, except the boundary resource user, in a system with a resource saturation rate smaller than or equal to that of the boundary resource user, and with a requested amount of resource larger than their corresponding minimum resource quota; n: a number of C-class resource users in a system with a resource saturation rate larger than that of the boundary resource user; and $\Sigma$: a summation operation.

11. The computer system resource allocation method according to claim 10, wherein using the set condition to determine the boundary resource user comprises:
   (a) using one of the sorted resource users as a temporary boundary resource user;
   (b) substituting the temporary boundary resource user into Inequality III and Inequality IV as one of the boundary resource users;
   (c) if the two inequalities are both satisfied, determining the temporary resource user to be one of the boundary resource users; and
   (d) if the two inequalities are not both satisfied, using another one of the sorted resource users as the temporary boundary resource user to perform steps (b)-(d).

12. The computer system resource allocation method according to claim 11, wherein using the one of the sorted resource users as a temporary boundary resource user comprises:
   if Inequality III is not satisfied, selecting, from the sorted resource users, a first resource user with a resource saturation rate smaller than that of the temporary boundary resource user, and using data of the first selected resource user as that of a temporary boundary resource user; and
   if Inequality IV is not satisfied, selecting, from the sorted resource users, a second resource user with a resource saturation rate larger than that of the temporary boundary resource user, and using data of the second selected resource user as that of a temporary boundary resource user.

13. The computer system resource allocation method according to claim 12, wherein:
   sorting resource users with the requested amount of resource larger than their corresponding minimum resource quota comprises:
      using a resource user's resource allocation data to form one tree node,
      according to a magnitude of the calculated resource saturation rate, inserting the tree node into a sort binary tree, or updating a data node of the sort binary tree for storing the resource user according to the tree node, and
      adjusting locations and mutual relations among nodes of the sort binary tree to maintain the binary tree; wherein the resource user's resource allocation relevant data comprises a resource saturation rate, a requested amount of resource, a minimum resource quota, and a maximum resource quota of the resource user;
   correspondingly, using one of the sorted resource users as the temporary boundary resource user comprises using a resource user stored in a root node of the sort binary tree as a temporary boundary resource user;
   correspondingly, selecting, from the sorted resource users, the first resource user with the resource saturation rate smaller than that of the temporary boundary resource user comprises selecting a resource user corresponding to a direct child node at one side of the sort binary tree with a resource saturation rate smaller than or equal to that of the temporary boundary resource user; and correspondingly selecting, from the sorted resource users, the second resource user with the resource saturation rate larger than that of the temporary boundary resource user comprises selecting a resource user corresponding to a direct child node at one side of the sort binary tree with a resource saturation rate larger than that of the temporary boundary resource user.

14. The computer system resource allocation method according to claim 13, wherein the resource user's resource allocation relevant data further comprises: a sum of requested amounts of resources of resource users with a resource saturation rate smaller than or equal to that of the resource user, a sum of minimum resource quotas of resource users with a resource saturation rate smaller than or equal to that of the resource user, a sum of maximum resource quotas of resource users with a resource saturation rate larger than that of the resource user, a sum of minimum resource quotas of resource users with a resource saturation rate larger than that of a resource user corresponding to the node, and a sum of requested amounts of resources of resource users with a requested amount of resource smaller than their corresponding minimum quota.

15. The computer system resource allocation method according to claim 9, wherein sorting resource users whose respective requested amount of resource is larger than the corresponding minimum resource quota comprises:
    using a resource user's resource allocation data to form one tree node;
    according to a magnitude of a resource saturation rate, inserting the tree node into a sort binary tree, or updating a data node of the tree node for storing the resource user according to the tree node, and
    adjusting locations and mutual relations among nodes of the sort binary tree to maintain the binary tree as sorted, wherein the resource user's resource allocation relevant data comprises a resource saturation rate, a requested amount of resource, a minimum resource quota, and a maximum resource quota of the resource user.

16. The computer system resource allocation method according to claim 15, wherein the resource user's resource allocation relevant data further comprises:
    a sum of requested amounts of resources of resource users with a resource saturation rate smaller than or equal to that of the resource user, a sum of minimum resource quotas of resource users with a resource saturation rate smaller than or equal to that of the resource user, a sum of maximum resource quotas of resource users with a resource saturation rate larger than that of the resource user, a sum of minimum resource quotas of resource users with a resource saturation rate larger than that of a resource user corresponding to the node, and a sum of requested amounts of resources of resource users with a requested amount of resource smaller than their corresponding minimum quota.

17. A computer system resource allocation device, comprising:
    an acquiring unit that acquires a total system resource and resource allocation data of each resource user submitting a resource application request, the resource allocation data including a maximum resource quota and a requested amount of resource by the each resource user;
    a resource saturation calculation unit that determines a corresponding resource saturation rate as a ratio between the amount of requested amount of resource and the maximum resource quote;
    a sorting unit that sorts the resource users according to the calculated resource saturation rates of the respective resource users;
    a classifying unit that determines a boundary resource user using a set condition, according to the sorted resource users, identifies resource users with a resource saturation rate smaller than or equal to that of the boundary resource user to be B-class resource users, and identifies resource users with a resource saturation rate larger than that of the boundary resource user to be C-class resource users; and
    a resource allocation unit that, for each of the B-class resource users, allocates a requested amount of resource as a resource quota of the total system resource to the B-class resource users; and for each of the C-class resource users, subtracts all amounts of resources allocated to the B-class resource users from the total system resource to obtain a remaining amount of resource, and allocates the remaining amount of resource to each of the C-class resource users according to a ratio between each C-class resource user's maximum resource quota and a sum of all C-class resource users' maximum resource quotas.

18. A computer system resource allocation device, comprising:
    an acquiring unit that acquires a total system resource and resource allocation data of each resource user submitting a resource application request, the resource allocation data including a minimum resource quota, a maximum resource quota, and a requested amount of resource by the each resource user;
    a resource saturation calculation unit that determines a corresponding resource user's resource saturation rate by determining a difference between the minimum resource quota from the requested amount of resource, and determining a ratio between the difference and the maximum resource quota;
    a sorting unit that sorts resource users whose respective requested amount of resource is larger than the corresponding minimum resource quota according to the calculated resource saturation rate of the each resource user;
    a classifying unit that identifies resource users with the requested amount of resource smaller than or equal to their corresponding minimum resource quota as A-class resource users, determines a boundary resource user using a set condition according to the sorted resource users, and identifies resource users with a resource saturation rate smaller than or equal to that of the boundary resource user to be B-class resource users, and identifying resource users with a resource saturation rate larger than that of the boundary resource user to be C-class resource users; and
    a resource allocation unit that, for each of the A-class resource users and the B-class resource users, allocates a requested amount of resource as a resource quota of the total system resource to each of the A-class resource users and the B-class resource users; and
    for the C-class resource users, determines a remaining amount of resource as a difference between the total system resource and all amount of resource allocated to the A-class resource users and the B-class resource users and a sum of minimum resource quotas of all C-class resource users, and uses a ratio between each C-class resource user's maximum resource quota and a sum of maximum resource quotas of all C-class resource users as a resource allocation amount, and allocates the resource allocation amount and the minimum resource quota of the C-class resource user to the each C-class resource user.

19. A non-transitory computer readable medium that stores a set of instructions that is executable by at least one processor of a computing system to cause the computing system to perform a method for computer system allocation, the method comprising:

acquiring a total system resource and resource allocation data of each resource user submitting a resource application request, the resource allocation data including a maximum resource quota and a requested amount of resource by the each resource user;

determining a corresponding resource saturation rate as a ratio between the amount of requested resource and the maximum resource quota;

sorting, by the processor, the resource users according to the calculated resource saturation rates of the respective resource users;

determining, by the processor, a boundary resource user using a set condition, according to the sorted resource users;

identifying, by the processor, resource users with a resource saturation rate smaller than or equal to that of the boundary resource user to be B-class resource users, and identifying resource users with a resource saturation rate larger than that of the boundary resource user to be C-class resource users; and for each of the B-class resource users, allocating, by the processor, a requested amount of resource as a resource quota of the total system resource to the B-class resource users; and for each of the C-class resource users, subtracting all amounts of resources allocated to the B-class resource users from the total system resource to obtain a remaining amount of resource, and allocating the remaining amount of resource to each of the C-class resource users according to a ratio between each C-class resource user's maximum resource quota and a sum of all C-class resource users' maximum resource quotas.

20. A non-transitory computer readable medium that stores a set of instructions that is executable by at least one processor of a computing system to cause the computing system to perform a method for computer system allocation, the method comprising:

acquiring a total system resource and resource allocation data of each resource user submitting a resource application request, the resource allocation data including a minimum resource quota, a maximum resource quota, and a requested amount of resource of the each resource user;

determining a corresponding resource user's resource saturation rate by determining a difference between the minimum resource quota from the requested amount of resource, and determining a ratio between the difference and the maximum resource quota;

sorting resource users whose respective requested amount of resource is larger than the corresponding minimum resource quota according to the calculated resource saturation rate of the each resource user;

identifying resource users with the requested amount of resource smaller than or equal to their corresponding minimum resource quota as A-class resource users;

determining a boundary resource user using a set condition according to the sorted resource users;

identifying resource users with a resource saturation rate smaller than or equal to that of the boundary resource user to be B-class resource users, and identifying resource users with a resource saturation rate larger than that of the boundary resource user to be C-class resource users; and for each of the A-class resource users and the B-class resource users, allocating a requested amount of resource as a resource quota of the total system resource to each of the A-class resource users and the B-class resource users; and for the C-class resource users, determining a remaining amount of resource as a difference between the total system resource and all amount of resource allocated to the A-class resource users and the B-class resource users and a sum of minimum resource quotas of all C-class resource users, and using a ratio between each C-class resource user's maximum resource quota and a sum of maximum resource quotas of all C-class resource users as a resource allocation amount, and allocating the resource allocation amount and the minimum resource quota of the C-class resource user to the each C-class resource user.

* * * * *

UNITED STATES PATENT AND TRADEMARK OFFICE
CERTIFICATE OF CORRECTION

PATENT NO. : 10,178,042 B2
APPLICATION NO. : 15/261431
DATED : January 8, 2019
INVENTOR(S) : Yang Zhang et al.

Page 1 of 1

It is certified that error appears in the above-identified patent and that said Letters Patent is hereby corrected as shown below:

On the Title Page

Item (30), in the Foreign Application Priority Data:
"Sep. 9, 2015 (CN)..............2015 1 0571508" should read
--Sep. 9, 2015 (CN)..............201510571508.1--.

In the Claims

Claim 10, Column 22, Inequality III, Line 56, "MinQuata$_h$)" should read as --MinQuota$_h$)--.

Claim 10, Column 22, Inequality III, Line 63, "MinQuata$_h$)" should read as --MinQuota$_h$)--.

Claim 10, Column 23, Inequality IV, Line 1, "MinQuata$_h$)" should read as --MinQuota$_h$)--.

Claim 10, Column 23, Inequality IV, Line 8, "MinQuata$_h$)" should read as --MinQuota$_h$)--.

Signed and Sealed this
Sixteenth Day of April, 2019

Andrei Iancu
*Director of the United States Patent and Trademark Office*